(12) United States Patent
Fogle

(10) Patent No.: US 6,813,260 B1
(45) Date of Patent: Nov. 2, 2004

(54) SYSTEMS AND METHODS FOR PRIORITIZED ACCESS IN A CONTENTION BASED NETWORK

(75) Inventor: Michael William Fogle, Rougemont, NC (US)

(73) Assignee: Ericsson Inc., Plano, TX (US)

(*) Notice: Subject to any disclaimer, the term of this patent is extended or adjusted under 35 U.S.C. 154(b) by 0 days.

(21) Appl. No.: 09/526,851

(22) Filed: Mar. 16, 2000

(51) Int. Cl.$^7$ .......................... H04Q 7/24; H04B 7/212
(52) U.S. Cl. .................. 370/338; 370/444; 370/448
(58) Field of Search .......................... 370/445, 447, 370/448, 449, 461, 462, 322, 329, 338, 346, 348, 349, 444

(56) References Cited

U.S. PATENT DOCUMENTS

| | | | |
|---|---|---|---|
| 4,232,294 A | | 11/1980 | Burke et al. ........... 340/147 LP |
| 4,561,092 A | | 12/1985 | Shaver .................. 370/89 |
| 5,329,531 A | * | 7/1994 | Diepstraten et al. ........ 370/347 |
| 5,422,887 A | * | 6/1995 | Diepstraten et al. ........ 370/448 |
| 5,636,223 A | | 6/1997 | Reardon et al. ............ 370/431 |
| 5,963,559 A | * | 10/1999 | Ohki .......................... 370/445 |
| 6,014,087 A | * | 1/2000 | Krishnakumar et al. . 340/825.5 |
| 6,078,591 A | * | 6/2000 | Kalkunte et al. ........... 370/448 |
| 6,493,335 B1 | * | 12/2002 | Darcie et al. ............... 370/344 |
| 6,553,076 B1 | * | 4/2003 | Huang ........................ 375/257 |

FOREIGN PATENT DOCUMENTS

| | | | |
|---|---|---|---|
| JP | 10107818 A | 4/1998 | ........... H04L/12/40 |
| WO | WO96/31036 | 10/1996 | ........... H04L/12/28 |

OTHER PUBLICATIONS

*Part 11: Wireless LAN Medium Access Control(MAC) and Physical Layer(PHY) specifications, IEEE Std 802.11–1997, Local and Metropolitan Area Networks 802.11*, pp. 1–178 (Jun. 26, 1997).

* cited by examiner

*Primary Examiner*—Chau Nguyen
*Assistant Examiner*—Soon-Dong Hyun (57) ABSTRACT

Systems and methods provide prioritized access to a shared communication medium which utilizes a contention based access arbitration mechanism and a contention-free arbitration mechanism. A first time duration during which the communication medium must be idle for a station to access the communication medium is associated with the contention based mechanism and a second time duration during which the communication medium must be idle to access the communication medium is associated with the contention-free mechanism. The first time duration is greater than the second time duration. Priority access to the shared communication may be provided by determining a priority time duration between the second time duration and the first time duration and accessing the shared communication medium if the shared communication medium is idle for the priority time duration.

37 Claims, 5 Drawing Sheets

SYSTEMS AND METHODS FOR PRIORITIZED ACCESS IN A CONTENTION BASED NETWORK

BACKGROUND OF THE INVENTION

The present invention relates to networks of data processing systems and more particularly to contention based networks.

As wireless technology becomes more ubiquitous, the interest in wireless networks which may carry both voice and data traffic has increased. To address the need for standardized operations in wireless networks, the Institute of Electrical and Electronics Engineers (IEEE) proposed the IEEE 802.11 Standard for Wireless LAN Medium Access Control and Physical Layer specifications (the 802.11 standard). The 802.11 standard provides a framework for wireless stations to intercommunicate utilizing a shared access wireless communications medium.

The 802.11 standard provides two mechanisms for a wireless station to access the shared wireless communication medium. These two mechanisms are a contention free arbitration mechanism and a contention based arbitration mechanism. Both of these access methods are supported concurrently by the 802.11 standard.

The contention free arbitration mechanism utilizes a point coordinator function (PCF) to control access to the shared communications medium. When a PCF is established, the PCF polls registered wireless stations for communications and provides communication medium access to the stations based on the results of this polling. Thus, the PCF may prioritize messages within the stations which are included in the polling sequence. For a wireless station to be included in the PCF polling sequence, the wireless station must support PCF operations and must make itself known to the PCF.

The contention based mechanism utilizes a random back-off period to provide fairness in accessing the shared communications medium. In the contention based period, each station monitors the shared communications medium and determines if the medium has been silent for a predefined period of time. If so, then the stations waits a random amount of time longer and, if the communications medium is still silent, transmits its message on the medium.

Figure 1:
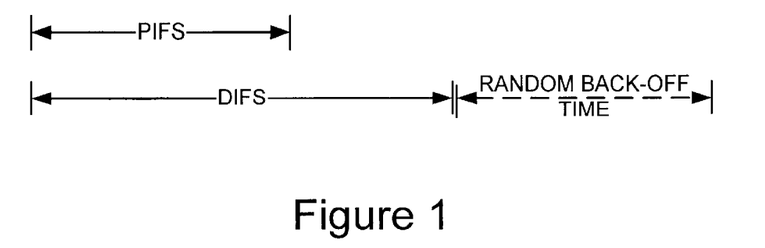
FIG. 1 is a timing diagram of a conventional shared medium arbitration sequence according to the IEEE 802.11 standard.

The interaction of the contention-free and contention based arbitration mechanisms may be seen in FIG. 1. As seen in FIG. 1, in order to allow a PCF to take control of the wireless medium, a PCF monitors the wireless medium for an amount of time called the PCF inter-frame spacing (PIFS) period. If the wireless medium is idle for the PIFS period, then the PCF gains access to the medium and takes control of the medium to become master of the medium. If a PCF is established as a master, then a contention-free period is used for the round-robin polling of the PCF compatible stations which are registered with the PCF. Thus, the PIFS period may be utilized by a PCF to gain prioritized access to the wireless medium to implement the contention-free arbitration of the wireless medium.

FIG. 1 also illustrates the contention based access to the wireless medium. As is seen in FIG. 1, the stations utilizing the distributed coordination function (DCF) determine whether the wireless communication medium is idle by monitoring the medium and determining that the medium is idle for a period of time referred to as the DCF inter-frame spacing (DIFS) period. The DIFS period is longer than the PIFS period. The stations using DCF also utilize a random back-off time which is added to the DIFS period to implement a Carrier Sense Multiple Access with Collision Avoidance (CSMA/CA) mechanism. For a station to gain access to the wireless medium, the station must sense that the wireless medium is idle for a period of time equal to the DIFS period plus the random back-off time.

Thus, by creating two, non-overlapping idle times, the 802.11 standard provides for prioritized access by a PCF while still allowing for contention based access. Such a two tiered system may be especially well suited to networks which carry both voice and data. Voice communications typically are more time sensitive than data communications in that a voice transmission may not tolerate long delays between communications whereas data communications typically are less sensitive to such delays for any given group of communications. Voice communications may, therefore, utilize the point coordinated communications (i.e., contention-free) to assure that the voice communications will be handled in a manner which may provide acceptable data rates and inter-communication delays so as to provide acceptable voice communications to an end user. Distributed coordination function communications (i.e., contention based) could then be utilized for less time critical data communications.

While the use of PCF and DCF communications within a network may theoretically provide suitable performance for a hybrid voice/data network, such performance may be based on an assumption that all stations utilizing voice communications support point coordinated communications. However, point coordinated communications may not be supported by all stations sharing a wireless communications medium. Thus, voice traffic for such stations may be required to be transmitted utilizing the contention based DCF communications which may result in a loss of performance for such voice communications.

In light of the above discussion, a need exists for improvements in contention based mechanisms for accessing a shared communication medium.

SUMMARY OF THE INVENTION

The present invention may provide systems and methods for providing prioritized access to a shared communication medium where the shared medium is accessed utilizing a contention based access arbitration mechanism and a contention-free arbitration mechanism. The contention based mechanism has an associated first time duration during which the shared communication medium must be idle for a station to access the shared communication medium utilizing the contention based access arbitration mechanism. The contention-free mechanism has associated with it a second time duration during which the shared communication medium must be idle to access the shared communication medium utilizing the contention-free arbitration mechanism. The first time duration is greater than the second time duration. Priority access to the shared communication medium may then be provided by determining a priority time duration between the second time duration and the first time duration for a station seeking contention based priority access to the shared communication medium and accessing the shared communication medium if the shared communication medium is idle for the priority time duration.

By utilizing the time between the contention-free period and the contention period, this first embodiment of the present invention may provide prioritized access over other contention based accesses without interfering with either the contention based access or the contention-free access.

Furthermore, stations in the network which do not support contention-free access may utilize the present invention for priority access utilizing a contention based approach. Thus, the present invention may provide priority access to systems without requiring the stations to support contention-free access.

In a particular aspect of the first embodiment of the present invention, the determination of a priority time duration may be carried out by determining a priority time duration between the second time duration and the first time duration based on a priority of a station seeking access to the shared communication medium. Furthermore, this prioritzed access may be provided by determining a pseudo-random value between a minimum random value and a maximum random value, multiplying the pseudo-random value by a priority slot time to provide a random back-off time and adding the random back-off time to the second time duration to provide the priority time duration. Preferably, the sum of the second time duration and the product of the maximum random value and the priority slot time is less than the first time duration. Thus, collision avoidance may be provided to the prioritized access utilizing a random back-off procedure in the period between the contention-free period and the contention based period.

In particular embodiments of the present invention where all stations supporting the prioritized access are of equal priority, the minimum random value may be zero. However, the minimum random value may also be based on the priority of the station seeking access to the shared communication medium. Similarly, the maximum random value may be based on the priority of the station seeking access to the shared communication medium.

In a preferred embodiment of the present invention the shared communication medium is a wireless communication medium. In a particularly preferred embodiment, the contention based arbitration mechanism and the contention-free based arbitration mechanism comprise an IEEE 802.11 standard compliant network. In such an embodiment, the step of determination of a priority time duration may be made by determining a priority time duration between the PIFS period and the DIFS period.

Furthermore, the determination of the priority time duration may be made by determining a pseudo-random value in the interval from 0 to CW, where CW is a value between the 802.11 parameters aCWmin and aCWmax. The pseudo-random value may be multiplied by a priority slot time which is less than the 802.11 parameter aSlotTime to provide a PIFS random back-off time. The PIFS random back-off time may then be added to the PIFS period to provide the priority time duration. Preferably, the sum of the PIFS period and the product of aCwmax and the priority slot time is less than the DIFS period.

The determination of a pseudo-random value may also be determined in the interval from aPIFSPriority_x_CWmin to CW, where aPIFS Priority_CWmin is a value associated with a priority of a message to be transmitted on the shared communications medium and where CW is a value between aCWmin and aCWmax. The value of aPIFSPriority_x_CWmin may be based on the information content of the message to be transmitted on the shared communication medium. The value of aPIFSPriority_x_CWmin may also be based on the priority of the station seeking access to the shared communication medium. Thus, through the use of aPIFSPriority_x_CWmin, different priority levels within the time period between the PIFS period and the DIFS period may be provided. The higher the value of aPIFSPriority_x_CWmin, the lower the priority of the message.

In an alternative embodiment of the present invention, prioritized access in an IEEE 802.11 contention based arbitration mechanism for a shared communication medium utilizing a random back-off time after a DIFS time interval may be provided by establishing a priority parameter defining a lower bound of an interval from which the random back-off time is selected. The interval from which the random back-off time is then selected to be from the priority parameter to CW and a random back-off time selected from the selected interval. As with the previous embodiment, the priority parameter may be set based on a priority associated with the type of information to be transmitted on the shared access communication medium.

In a further embodiment of the present invention, a communications station for communicating in a network having a shared communication medium utilizing a contention based access arbitration mechanism and a contention-free arbitration mechanism is provided. A first time duration is defined during which the shared communication medium must be idle for a station to access the shared communication medium utilizing the contention based access arbitration mechanism and a second time duration defined during which the shared communication medium must be idle to access the shared communication medium utilizing the contention-free arbitration mechanism. The communication station includes a transceiver configured so as to communicate with the shared communication medium and a sense circuit, operably associated with the transceiver, which is configured so as to sense if the shared communication medium is idle. A medium access controller, operably associated with the transceiver and the sense circuit, is configured so as to determine a priority time duration between the second time duration and the first time duration for the station and to access the shared communication medium utilizing the transceiver to take control of the shared access communication medium if the sense circuit indicates that the shared communication medium is idle for the priority time duration.

In a further embodiment, the medium access controller is further configured to determine the priority time duration between the second time duration and the first time duration based on a priority of a message to be transmitted on the shared communication medium.

The medium access controller may further include a pseudo-random number generator configured to determine a pseudo-random value between a minimum random value and a maximum random value, a multiplier configured to multiply the pseudo-random value by a priority slot time to provide a random back-off time, and an adder configured to add the random back-off time to the second time duration to provide the priority time duration. Furthermore, the minimum random value may be zero. Alternatively, the minimum random value is based on the priority of the station. Similarly, the maximum random value may be based on the priority of the station.

Preferably, the shared communication medium is a wireless communication medium. In particular, the contention based arbitration mechanism and the contention-free based arbitration mechanism comprise an IEEE 802.11 standard compliant network in which case, the medium access controller may be an IEEE 802.11 compliant medium access controller.

In such an IEEE 802.11 embodiment, the medium access controller may be configured to determine a priority time duration between the PIFS period and the DIFS period. Furthermore, the medium access controller may include a pseudo-random number generator configured to provide a pseudo-random value in the interval from 0 to CW where CW is a value between aCWmin and aCWmax, a multiplier configured to multiply the pseudo-random value by a priority slot time which is less than aSlotTime to provide a PIFS random back-off time and, an adder configured to add the PIFS random back-off time to the PIFS period to provide the priority time duration.

Furthermore, the pseudo-random number generator may be configured to generate a pseudo-random value in the interval from aPIFSPriority_x_CWmin to CW rather than 0 to CW, where aPIFSPriority_x_Cwmin is a value associated with a priority of a message to be transmitted on the shared communications medium and where CW is a value between aCWmin and aCWmax. The value of aPIFSPriorityx_x_CWmin may be based on the priority of the station seeking access to the shared communication medium. The value of aPIFSPriority_x_CWmin may also be based on the information content of a message to be transmitted on the shared communication medium.

In a further alternative embodiment of the present invention, a communications station which provides prioritized access in an IEEE 802.11 contention based arbitration mechanism for a shared communication medium utilizing a random back-off time after a DIFS time interval includes a transceiver configured so as to communicate with the shared communication medium and a sense circuit operably associated with the transceiver and configured so as to sense if the shared communication medium is idle. A medium access controller is operably associated with the transceiver and the sense circuit and configured so as to establish a priority parameter defining a lower bound of an interval from which the random back-off time is selected. The interval from which the random back-off time is then selected to be from the priority parameter to CW and a random back-off time selected from this interval. The priority parameter may be set based on a priority associated with the type of information to be transmitted on the shared access communication medium.

By providing the ability to have priority access for contention based access to a shared communication medium, the present invention may facilitate the use of such networks for both voice and data communications. Furthermore, voice communications may benefit from improved performance even in systems where stations do not support contention-free access to the communications because of the provision of contention based priority.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment or an embodiment combining software and hardware aspects.

The present invention provides a priority mechanism which may be utilized in contention based systems for accessing a shared communications medium. Embodiments of the present invention may be particularly well suited to systems which utilize both contention-free and contention based access to a shared communication medium. Thus, the present invention may be utilized in an IEEE 802.11 standard compliant system. Accordingly, embodiments of the present invention will be described herein with reference to an IEEE 802.11 standard network, however, the present invention should not be construed as limited to 802.11 standard networks.

Figure 2:
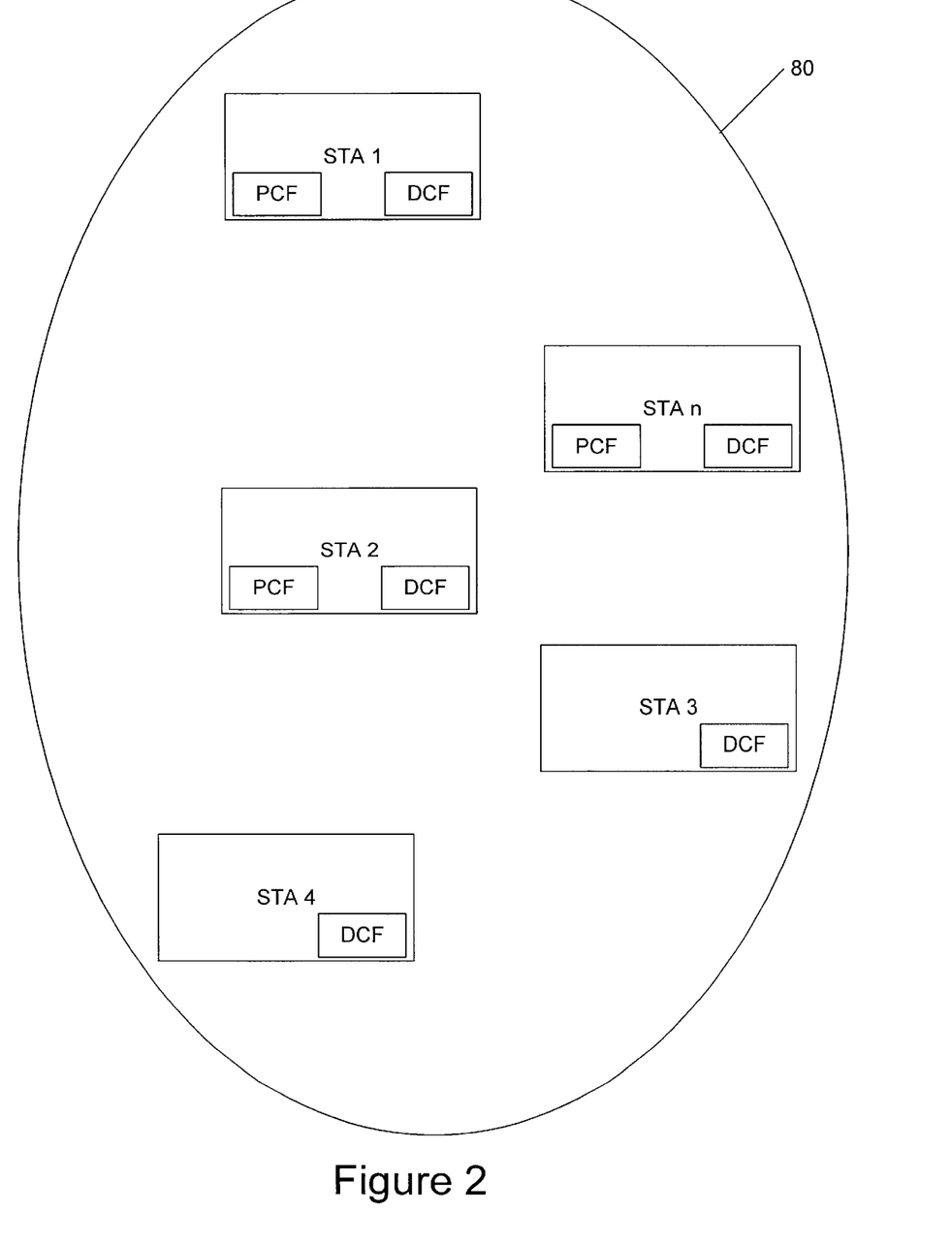
FIG. 2 is a block diagram of a wireless local area network suitable for use with the present invention.

FIG. 2 illustrates a network which may utilize the present invention. As seen in FIG. 2, a basic service set (BSS) 80 may include several stations, STA 1 through STA n, which communicate over a shared communications medium. The BSS 80 may also include and access point (not shown) which provides access to other communications medium for stations in the BSS 80. The stations may be 802.11 standard compliant stations and may communicate over a shared wireless communications medium. However, the present invention may have applications for use with any shared communications medium, wired or wireless.

As is further seen in FIG. 2, some of the communications stations, STA 1, STA 2 and STA n, support both contention free access to the shared communication medium and contention based access to the shared communication medium. Thus, STA 1, STA 2 and STA n are illustrated as having both PCF and DCF capabilities. However, as is also illustrated in FIG. 2, some of the stations, STA 3 and STA 4, may only support contention based access to the shared communication medium. Thus, STA3 and STA 4 are illustrated as only incorporating DCF.

While the present invention is described with reference to the network configuration of FIG. 2, as will be appreciated by those of skill in the art, the present invention may be utilized in other network configurations. Thus, the present invention should not be construed as limited to the network configuration of FIG. 2.

Figure 3:
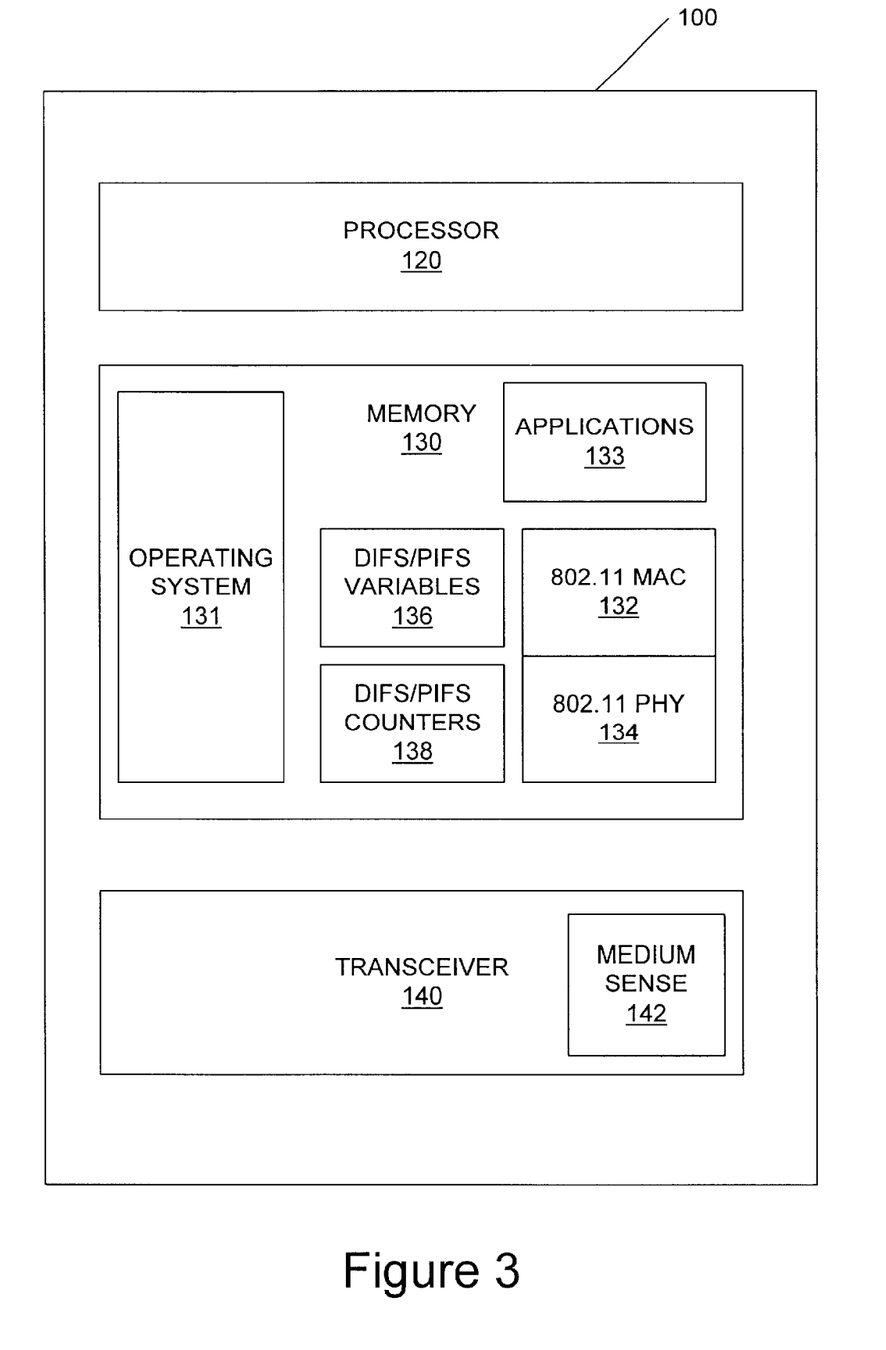
FIG. 3 is a block diagram of a station for use in a wireless network incorporating the present invention.

FIG. 3, illustrates one embodiment of a station 100, which may be utilized with the present invention. As seen in FIG. 3, the station 100 may include a processor 120. The processor 120 may be a conventional data processor such as a microprocessor or may be a custom processor such as a digital signal processor. The processor 120 accesses memory 130 which may include an operating system 131 and applications 133 for controlling input and output devices, storage access or the like. The memory 130 may also include program code for implementing a layered communication protocol such as the 802.11 standard. Thus, the memory 130 may include a medium access control (MAC) function 132 and a physical layer (PHY) function 134. The memory 130 may also include variables 136 and counters 138 from implementing the MAC 132 and PHY 134 functions.

As is further illustrated in FIG. 3, the station 100 also includes a transceiver 140 for transmitting and receiving communications from the shared access medium. The transceiver 140 also preferably includes medium sense circuitry 142 for sensing whether the communications medium is busy. Such transceiver 140 and medium sense circuitry 142 are known to those of skill in the art and need not be described further herein.

While the present invention will be described with reference to the program code implementing the MAC 132 and PHY 134 functions incorporating the present invention, as will be appreciated by those of skill in the art, the present invention may be implemented in dedicated circuitry or a combination of software and dedicated circuitry. Thus, for example, the MAC and PHY layers 132 and 134 may be implemented in one or more custom ASICs or other dedicated circuitry that carries out the functions described herein. Thus, the present invention should not be construed as limited to the software implementation described herein but should be construed to include electronic circuitry for carrying out the described functions as well as combinations of circuitry and software for carrying out the functions.

Figure 4:
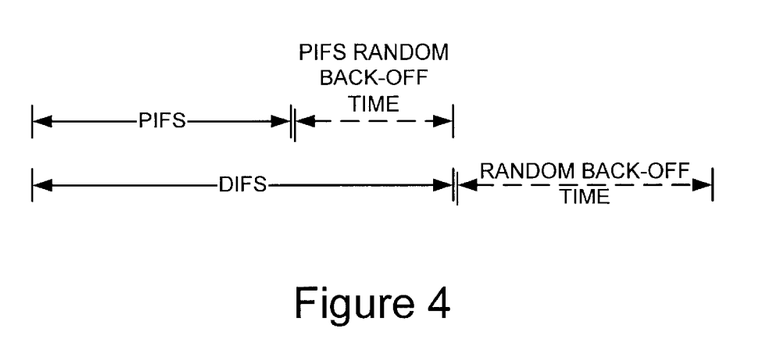
FIG. 4 is a timing diagram of a shared medium arbitration sequence which may provide prioritized access for contention based arbitration according to one embodiment of the present invention.

FIG. 4 is a timing diagram which illustrates one embodiment of the present invention. As seen in FIG. 4, the time between the PIFS period and the DIFS period may be utilized to allow prioritized access of stations, such as stations STA 3 and STA 4, which only support contention based access to the shared communication medium. However, the operations of the present invention may also be incorporated into stations, such as stations STA 1, STA 2, and STA n, which provide both contention-free and contention based access. To gain access of the shared communication medium a station waits for a time less than the time associated with the contention based access (i.e., the DIFS period) and longer than the time associated with the contention-free access (i.e., the PIFS period). If the communications medium is idle at this time, the station takes control of the communication medium.

The period of time when the station may obtain prioritized access to the communication medium is illustrated in FIG. 4 as the PIFS random back-off time period. To avoid contention during the PIFS random back-off time period a station may generate a pseudo-random value and multiply this value by an interval which is a sub-interval of the PIFS random back-off time period. To assure that collisions will not occur with conventional DCF communications, the random value should be limited to a range of from 0 to the number of intervals in the PIFS random back-off time period. Thus, the period of time that a station would wait to get prioritized contention based access would fall within the PIFS random back-off time period illustrated in FIG. 4. After generating the pseudo-random number the station would then wait that number of intervals after the PIFS period and, if the communication medium was idle, access the communication medium.

Figure 5:
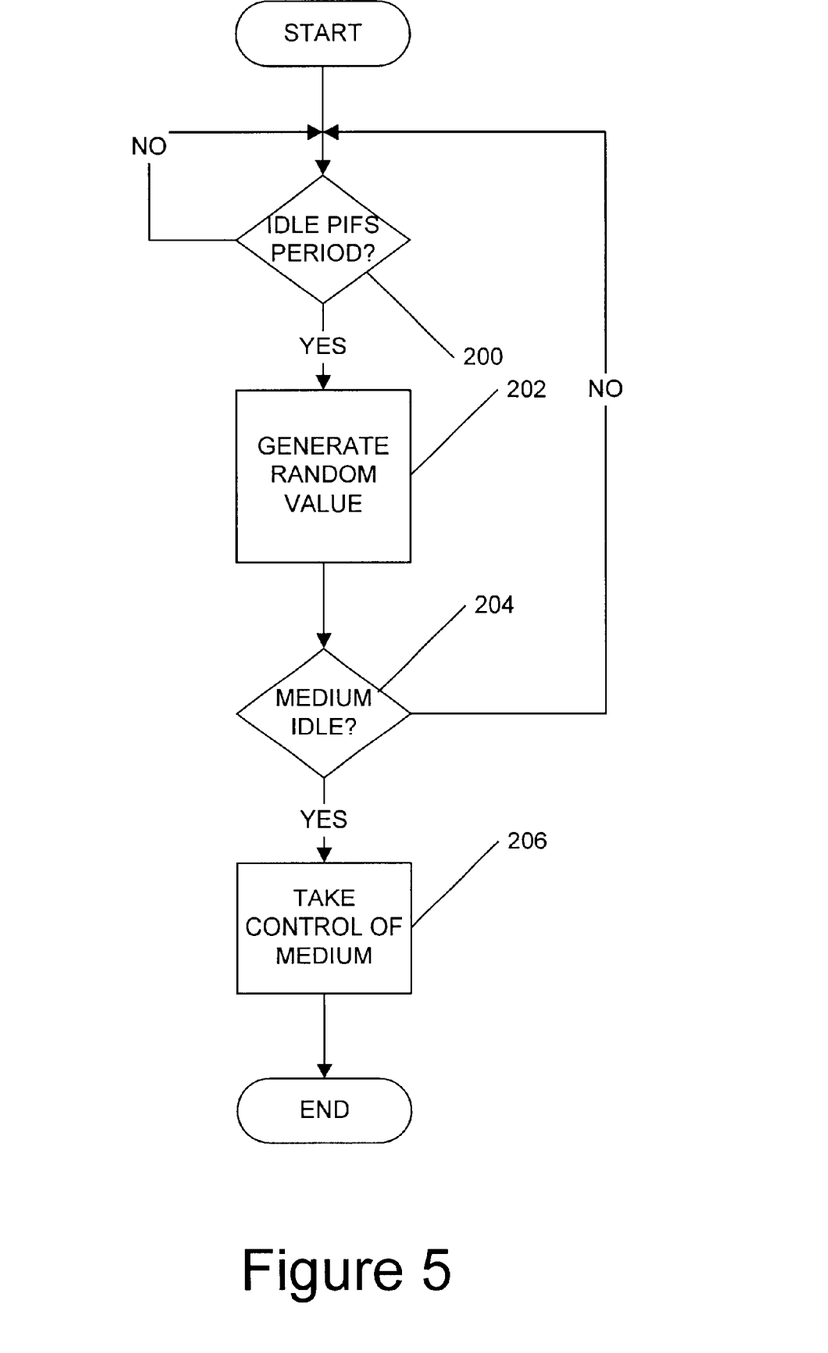
FIG. 5 is a timing diagram of a shared medium arbitration sequence which may provide prioritized access for contention based arbitration according to a second embodiment of the present invention.

Operations for carrying out such a prioritized access between the PIFS period and the DIFS period are illustrated in FIG. 5. These operations may be carried out by the MAC 132 and PHY 134 functions of station 100 illustrated in FIG. 3 and utilizing stored DIFS/PIFS variables 136 and DIFS/PIFS counters 138. Operations begin by determining if the communication medium has been idle for the PIFS period (block 200). Such a determination may be made by periodically utilizing the medium sense circuitry 142 to determine if the shared communication medium is idle. If the medium was not idle for the PIFS period, then the station 100 waits for the beginning of the next PIFS period.

If the communication medium is idle for the PIFS period, then the station generates a pseudo-random value, for example using a pseudo-random number generator, to establish the PIFS random back-off time which the station must wait before attempting to access the shared communication medium (block 202). This pseudo-random value may be set as value in a PIFS/DIFS counter 138 and may be generated based on a minimum and maximum value stored as a DIFS/PIFS variable 136. The pseudo-random value may then be utilized to determine if the medium is idle for the PIFS random back-off time specified by the pseudo-random value (block 204). Such a determination may be made by decrementing the counter initialized with the pseudo-random value each interval and then testing the communication medium utilizing the medium sense circuitry 142 when the count reaches zero. If the medium is not idle (block 204), then the station 100 may wait for the next PIFS period. If the medium is idle (block 204), then the station may take control of the medium to access the medium for communications (block 206).

In an 802.11 embodiment of the present invention, the DIFS random back-off time of FIG. 4 is specified as integer multiples of a parameter called aSlotTime which is specified as 20 microseconds for the frequency hopping version of the 802.11 standard. The DIFS period is specified as 50 microseconds and the PIFS period is specified as 30 microseconds. Thus, the intervals of the PIFS random back-off time period should be less than aSlotTime, otherwise, only one interval would exist between the PIFS period and the DIFS period. Accordingly, in an 802.11 embodiment of the present invention it is preferred that the intervals for the PIFS random back-off time period be less than aSlotTime and that the station 100 be capable of counting intervals smaller than aSlotTime. This interval may be referred to herein as aPrioritySlotTime.

The PIFS random back-off time that a station utilizes may then be described as:

PIFS_random_back-off_time=Random( )*aPrioritySlotTime where

PIFS_Period+PIFS_random_back-off_time<DIFS_Period and wherein Random ( ) is a pseudo-random integer number drawn from a uniform distribution over the interval [0,CW], where CW is an integer between IEEE 802.11 attributes aCWmin and aCWmax. Thus, aPrioritySlotTime may be set to 20 microseconds divided by aCWmax or such other maximum value as may be appropriate for the intended application. The number of intervals in the PIFS random back-off time period will establish the number of prioritzed accesses that are supported.

Because of physical layer specifications such as clear channel assessment times, receive to transmit and transmit to receive times, receive to transmit radio hardware times and the like, it may be beneficial to increase the duration of the DIFS period so as to provide sufficient time between the PIFS period and the DIFS period to provide prioritized access to the shared communication medium. The duration to which the DIFS period is extended may depend on the parameters aCCATime, aRxTxTurnaroundTime, aTxPLCDelay, aRxTxSwitchTime, aTxRampOn Time, aTxRfDelay, aRxRFDelay, aRxPLCDelay and aTxRampOffTime as defined in the 802.11 standard. Based on these implementation specific physical layer parameters, a value for aPrioritySlotTime may be established which allows the transceiver circuitry 140 to verify that the shared access communication medium is actually clear before transmitting a message. Once aPrioritySlotTime is defined, then the amount that the DIFS period should be extended may be determined based on the maximum value for CW. Such a maximum value may be aCWmax or a new maximum may be determined based on the number of messages desired for the prioritized access.

The DIFS period may be extended by changing the interval over which the DIFS random back-off time is determined. Conventionally, the pseudo-random value for the DIFS random back-off is selected from the interval [0, CW]. However, by adding the parameter aDIFSPriorityCWmin to replace the zero in the interval, the DIFS period may be effectively extended. Thus, the pseudo-random value for the DIFS random back-off time would be selected from the interval [aDIFSPriorityCWmin, CW]. By setting aDIFSPriorityCWmin to a value greater than zero, the DIFS period may be increased in increments of aSlotTime. Thus, for aDIFSPriorityCWmin greater than 0, the new DIFS-period becomes:

NewDIFS_Period=DIFS_Period+
   aDIFSPriorityCWmin*aSlotTime.

Then, when a PIFS random back-off time is determined, the sum of the PIFS period and the PIFS random back-off time must be less than the new DIFS period.

In a further aspect of the present invention, priority levels may be established within the PIFS random back-off time period by limiting the interval over which the pseudo-random value is established. Thus, a value of aPIFSPriority_x_CWmin may be established for each priority level where "x" is the priority level. The lower the value of aPIFSPriority_x_CWmin, the higher the priority. Thus, when a station generates a pseudo-random value it would generate a value in the interval [aPIFSpriority_x_CWmin, aCWmax]. By reducing the interval over which the pseudo-random number is generated to higher values, the duration which a station must wait before accessing the shared communication medium during the PIFS random back-off time period may be increased over other stations. By increasing aPIFSPriority_x_CWmin the effective duration of the PIFS period may be increased for the station. Accordingly, stations with longer effective PIFS periods will have a lower priority than stations with shorter effective PIFS periods.

Figure 6:
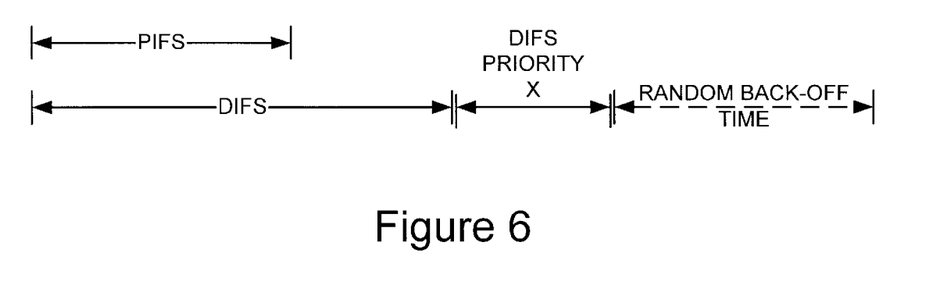
FIG. 6 is a flow chart illustrating operation of a station in carrying out the arbitration sequence of FIG. 4.

FIG. 6 illustrates an embodiment of the present invention which provides prioritization among contention based stations but the prioritization is achieved by extending the effective duration of the DIFS period. As seen in FIG. 6, a DIFS priority x period, where x is the priority level of a station, is established between the standard DIFS period and the DIFS random back-off time period. By varying the duration of the DIFS priority period to effectively change the start of the DIFS random back-off time period, contention based access to the shared communication medium may be prioritized. Stations with a longer DIFS priority period would have a lower priority than stations with a shorter duration DIFS priority period. By varying the start of the DIFS period for different stations a priority scheme may be provided within the constraints of the 802.11 standard.

Figure 7:
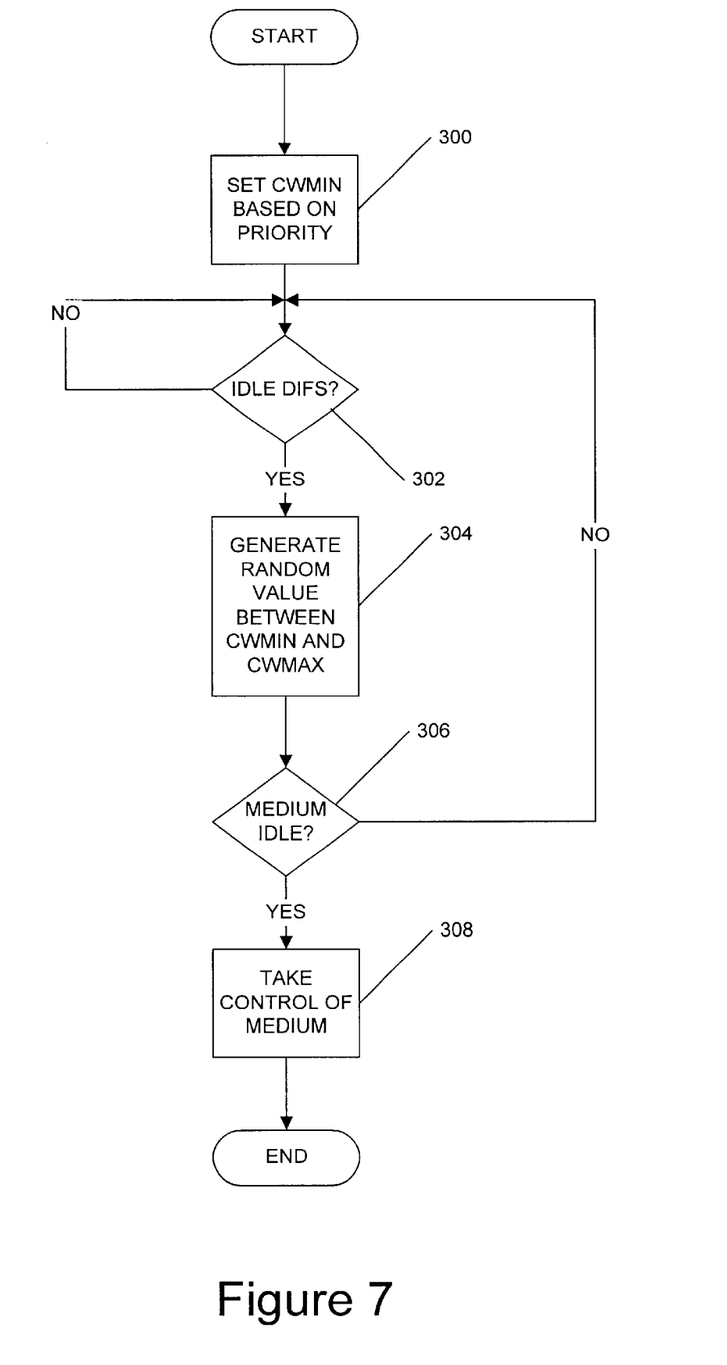
FIG. 7 is a flow chart illustrating operation of a station in carrying out the arbitration sequence of FIG. 5.

Operations for providing priority within the DIFS random back-off time period are illustrated in FIG. 7. These operations may be carried out by the MAC 132 and PHY 134 functions of station 100 illustrated in FIG. 3 and utilizing stored DIFS/PIFS variables 136 and DIFS/PIFS counters 138. Operations begin by establishing the minimum value (aDIFSPriority_x_CWmin) of the interval over which a pseudo-random number is generated for the DIFS random back-off time for a station 100 based on the priority of the communication of the station (block 300). The aDIFSPriority_x_CWmin value may be established on a communication by communication basis, may be pre-established for all communications from a station or may be established for groups of communications. For example, the aDIFSPriority_x_CWmin value may be increased for data communications and decreased for voice communications.

The station 100 also determines if the communication medium has been idle for the DIFS period (block 302). Such a determination may be made by periodically utilizing the medium sense circuitry 142 to determine if the shared communication medium is idle. If the medium was not idle for the DIFS period, then the station 100 waits for the beginning of the next PIFS period.

If the communications medium is idle for the DIFS period, then the station generates a pseudo-random value to establish the DIFS random back-off time which the station must wait before attempting to access the shared communication medium (block 304). This pseudo-random value may be set as value in a PIFS/DIFS counter 138 and may be generated based on the priority established by the minimum value aDIFSPriority_x_Wmin and less than a maximum value each of which may be stored as a DIFS/PIFS variable 136. The pseudo-random value may then be utilized to determine if the medium is idle for the DIFS random back-off time specified by the pseudo-random value (block 306). Such a determination may be made by decrementing the counter initialized with the pseudo-random value each interval and then testing the communication medium utilizing the medium sense circuitry 142 when the count reaches zero. If the medium is not idle (block 306), then the station 100 may wait for the next DIFS period. If the medium is idle (block 306), then the station may take control of the medium to access the medium for communications (block 308).

In an 802.11 embodiment of the present invention, the random number would be generated between aDIFSPriority_x_CWmin and CWmax, where "x" corresponds to a priority value and the value aDIFSPriority_x_CWmin is established to change the effective start of the DIFS random back-off time period for the station. Thus, the DIFS period embodiment of the present invention may be implemented by adding the aDIFSPriority_x_CWmin parameter and utilizing this parameter to establish the bounds of the pseudo-random value generation for the DIFS random back-off time of a station.

The new parameters described above which provide for prioritization of contention based communications may be established a initial values by for example, users, network administrators or equipment manufacturers. An access point in the network may be informed of a stations prioritization capabilities during authentication and association, as for example, defined in the 802.11 standard. Such notification may require additions to the Capability Information field within the Association Request frame.

The initial values for the priority parameters may be updated dynamically based on, for example, traffic load as seen by the access point. The access point could also deny a stations request for prioritized access to the shared medium. Such control could be provided by a parameter aDCFPriorityCapable which could be set to true or false by an access point. Similarly, control to prioritized access could be achieved by manipulation of the priority parameters. For example, if aDIFSPriority_x_CWmin is set to zero for each station, then no priority access is provided in the DIFS period only embodiment of the present invention. Similar manipulation of parameters may be provided in the other embodiments of the present invention.

The flowcharts and block diagrams of FIGS. 2, 3, 5 and 7 illustrate the architecture, functionality, and operation of possible implementations for prioritized access in a contention based network according to the present invention. In this regard, each block in the flowcharts may represent a circuit, system or module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Thus, while the present invention is described as first determining if the shared medium is idle and then generating a random value, such operations could occur in parallel so that if the medium is idle for the specified time, the random value has already been generated. Accordingly, the present invention should not be construed as limited to discrete operations but should be construed as teaching the results of the operations irrespective of the division of actions which produced such results.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of providing prioritized access to a shared communication medium utilizing a contention based access arbitration mechanism and a contention-free based access arbitration mechanism having a first time duration during which the shared communication medium must be idle for a station to access the shared communication medium utilizing the contention based access arbitration mechanism and a second time duration during which the shared communication medium must be Idle to access the shared communication medium utilizing the contention-free based access arbitration mechanism, wherein the first time duration is greater than the second time duration, the method comprising the steps of:

determining a priority time duration between the second time duration and the first time duration for a station seeking contention based priority access to the shared communication medium; and accessing the shared communication medium if the shared communication medium is idle for the priority time duration.

2. A method according to claim 1, wherein the step of determining a priority time duration between the second time duration and the first time duration for a station seeking contention based priority access to the shared communication medium comprises the step of determining a priority time duration between the second time duration and the first time duration based on a priority of a station seeking access to the shared communication medium.

3. A method according to claim 2, wherein the step of determining a priority time duration between the second time duration and the first time duration based on a priority of a station seeking access to the shared communication medium comprises the steps of:

determining a pseudo-random value between a minimum random value and a maximum random value;

multiplying the pseudo-random value by a priority slot time to provide a random back-off time;

adding the random back-off time to the second time duration to provide the priority time duration; and wherein a sum of the second time duration and the product of the maximum random value and the priority slot time is less than the first time duration.

4. A method according to claim 3, wherein the minimum random value is zero.

5. A method according to claim 3, wherein the minimum random value is based on the priority of the station seeking access to the shared communication medium.

6. A method according to claim 3, wherein the maximum random value is based on the priority of the station seeking access to the shared communication medium.

7. A method according to claim 1, wherein the shared communication medium is a wireless communication medium.

8. A method according to claim 1, wherein the contention based arbitration mechanism and the contention-free based arbitration mechanism comprise an IEEE 802.11 standard compliant network.

9. A method according to claim 7, wherein the step of determining a priority time duration between the second time duration and the first time duration for a station seeking contention based priority access to the shared communication medium comprises the step of determining a priority time duration between the PIFS period and the DIFS period.

10. A method according to claim 9, wherein the step of determining a priority time duration between the PIFS period and the DIFS period comprises the steps of:

determining a pseudorandom value in the interval from 0 to CW, where CW is a value between aCWmin and aCWmax;

multiplying the pseudo-random value by a priority slot time which is less than aSlotTime to provide a PIFS random back-off time;

adding the PIFS random back-off time to the PIFS period to provide the priority time duration; and wherein a sum of the PIFS period and the product of aCWmax and the priority slot time is less than the DIFS period.

11. A method according to claim 10, wherein the step of determining a pseudo-random value in the Interval from 0 to CW, where CW is a value between aCWmin and aCWmax comprises the step of determining a pseudo-random value in the interval from aPIFSPriority_x_CWmin to CW, where aPIFSPriority_x_CWmin is a value associated with a priority of a message to be transmitted on the shared communications medium and where CW is a value between aCWmin and aCWmax.

12. A method according to claim 10, wherein aPIFSPriority_x_CWmin is based on information content of a message to be transmitted on the shared communication medium.

13. A method according to claim 10, wherein aPIFSPriority_x_CWmin is based on the priority of the station seeking access to the shared communication medium.

14. A method of providing prioritized access for a shared communication medium utilizing a random back-off time after a DIFS time interval, the method comprising the steps of:

provide an IEEE 802.11 contention based arbitration mechanism;

establishing a priority parameter defining a lower bound of an interval from which the random back-off time is selected, wherein the priority parameter is greater than zero;

selecting the interval from which the random back-off time is selected to be from the priority parameter to CW, where CW is a value between the 802.11 parameters aCWmin and aCWmax;

selecting a random back-off time from the selected interval.

15. A method according to claim 14, wherein the priority parameter is set based on a priority associated with the type of information to be transmitted on the shared access communication medium.

16. A communications station for communicating in a network having a shared communication medium utilizing a contention based access arbitration mechanism and a contention-free based access arbitration mechanism having a first time duration during which the shared communication medium must be idle for a station to access the shared communication medium utilizing the contention based access arbitration mechanism and a second time duration during which the shared communication medium must be idle to access the shared communication medium utilizing the contention-free based access arbitration mechanism, wherein the first time duration is greater than the second time duration, comprising:

a transceiver configured so as to communicate with the shared communication medium;

a sense circuit operably associated with the transceiver and configured so as to sense if the shared communication medium is idle; and a medium access controller operably associated with the transceiver and the sense circuit and configured so as to determine a priority time duration between the second time duration and the first time duration for the station and to access the shared communication medium utilizing the transceiver to take control of the shared access communication medium if the sense circuit indicates that the shared communication medium is idle for the priority time duration.

17. A communications station according to claim 16, wherein the medium access controller is further configured to determining the priority time duration between the second time duration and the first time duration based on a priority of a message to be transmitted on the shared communication medium.

18. A communications according to claim 17, wherein the medium access controller is further comprises:

a pseudo-random number generator configured to determine a pseudo-random value between a minimum random value and a maximum random value;

a multiplier configured to multiply the pseudo-random value by a priority slot time to provide a random back-off time;

an adder configured to add the random back-off time to the second time duration to provide the priority time duration; and wherein a sum of the second time duration and the product of the maximum random value and the priority slot time is less than the first time duration.

19. A communications station according to claim 18, wherein the minimum random value is zero.

20. A communications station according to claim 18, wherein the minimum random value is based on the priority of the station.

21. A communications station according to claim 18, wherein the maximum random value is based on the priority of the station.

22. A communications station according to claim 16, wherein the shared communication medium is a wireless communication medium.

23. A communications station according to claim 16, wherein the contention based arbitration mechanism and the contention-free based arbitration mechanism comprise an IEEE 802.11 standard compliant network and wherein the medium access controller comprises an IEEE 802.11 compliant medium access controller.

24. A communications station according to claim 23, wherein the medium access controller is configured to determine a priority time duration between the PIFS period and the DIFS period.

25. A communications station according to claim 24, wherein the medium access controller further comprises:

a pseudo-random number generator configured to provide a pseudo-random value in the interval from 0 to CW where CW is a value between aCWmin and aCWmax;

a multiplier configured to multiply the pseudo-random value by a priority slot time which is less than aSlotTime to provide a PIFS random back-off time;

an adder configured to add the PIFS random back-off time to the PIFS period to provide the priority time duration; and wherein a sum of the PIFS period and the product of aCWmax and the priority slot time is less than the DIFS period.

26. A communications station according to claim 25, wherein pseudo-random number generator is configured to generate a pseudo-random value in the interval from aPIFSPriority_x_CWmin to CW, where aPIFS Priority_CWmin is a value associated with a priority of a message to be transmitted on the shared communications medium and where CW is a value between aCWmin and aCWmax.

27. A communications station according to claim 25, wherein aPIFSPriority_x_CWmin is based information content of a message to be transmitted on the shared communication medium.

28. A communications station according to claim 25, wherein aPIFSPriority_x_CWmin is based on the priority of the station seeking access to the shared communication medium.

29. A communications station which provides prioritized access for a shared communication medium utilizing a random back-off time after a DIFS time interval, comprising:

a transceiver configured so as to communicate with the shared communication medium in an IEEE 802.11 contention based arbitration mechanism;

a sense circuit operably associated with the transceiver and configured so as to sense if the shared communication medium is idle; and a medium access controller operably associated with the transceiver and the sense circuit and configured so as to establish a priority parameter having a value greater than zero and defining a lower bound of an interval from which the random back-off time is selected, select the interval from which the random back-off time is selected to be from the priority parameter to CW, where CW is a value between the 802.11 parameters aCWmin and aCWmax, and select a random back-off time from the selected interval.

30. A communications station according to claim 29, wherein the priority parameter is set based on a priority associated with the type of information to be transmitted on the shared access communication medium.

31. A system for providing prioritized access to a shared communication medium utilizing a contention based access arbitration mechanism and a contention-free based access arbitration mechanism having a first time duration during which the shared communication medium must be idle for a station to access the shared communication medium utilizing the contention based access arbitration mechanism and a second time duration during which the shared communication medium must be idle to access the shared communication medium utilizing the contention-free based access arbitration mechanism, wherein the first time duration is greater than the second time duration, comprising:

means for determining a priority time duration between the second time duration and the first time duration for a station seeking contention based priority access to the shared communication medium; and means for accessing the shared communication medium if the shared communication medium is idle for the priority time duration.

32. A system according to claim 31, wherein the means for determining a priority time duration between the second time duration and the first time duration for a station seeking contention based priority access to the shared communication medium comprises means for determining a priority time duration between the second time duration and the first time duration based on a priority of a station seeking access to the shared communication medium.

33. A system according to claim 32, wherein the means for determining a priority time duration between the second time duration and the first time duration based on a priority of a station seeking access to the shared communication medium comprises:

means for determining a pseudorandom value between a minimum random value and a maximum random value;

means for multiplying the pseudo-random value by a priority slot time to provide a random back-off time;

means for adding the random back-off time to the second time duration to provide the priority time duration; and wherein a sum of the second time duration and the product of the maximum random value and the priority slot time is less than the first time duration.

34. A system according to claim 33, wherein the minimum random value is zero.

35. A system according to claim 33, wherein the minimum random value is based on the priority of the station seeking access to the shared communication medium.

36. A system according to claim 33, wherein the maximum random value is based on the priority of the station seeking access to the shared communication medium.

37. A system according to claim 31, wherein the shared communication medium is a wireless communication medium.

* * * * *